April 5, 1966   A. B. STILES   3,244,644
METHOD OF PREPARING A CATALYST COMPOSITION
CONSISTING OF RUTHENIUM ON ETA-ALUMINA
AND THE PRODUCT THEREOF
Filed Feb. 13, 1962
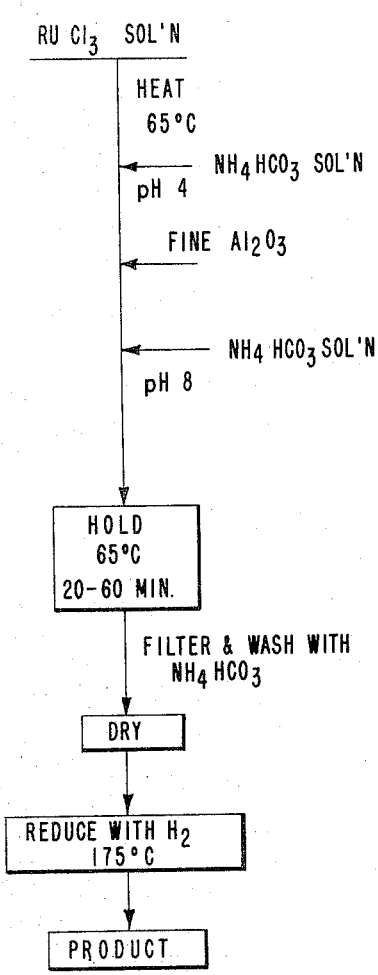
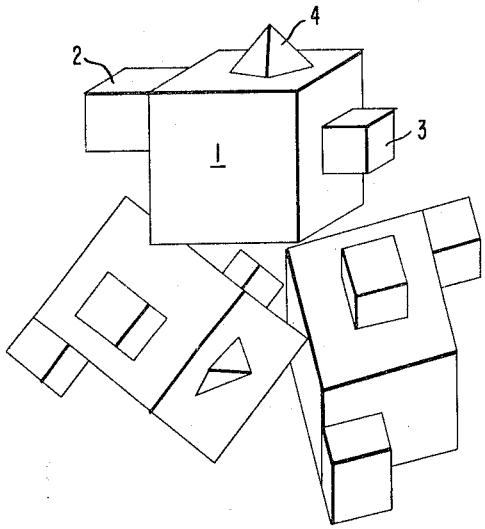
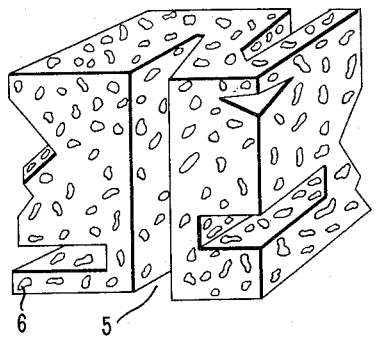
INVENTOR
ALVIN B. STILES
BY *Albert B. Griggs*
ATTORNEY

United States Patent Office 3,244,644
Patented Apr. 5, 1966

3,244,644
METHOD OF PREPARING A CATALYST COMPOSITION CONSISTING OF RUTHENIUM ON ETA-ALUMINA AND THE PRODUCT THEREOF
Alvin B. Stiles, Charleston, W. Va., assignor to E. I. du Pont de Nemours and Company, Wilmington, Del., a corporation of Delaware
Filed Feb. 13, 1962, Ser. No. 173,067
5 Claims. (Cl. 252—466)

This invention relates to hydrogenation catalysts and is more particularly directed to hydrogenation catalysts which are eta alumina bearing an epitaxial growth of ruthenium and to processes for producing such catalysts.

In the drawings:

FIGURE 1 illustrates a preferred process of the invention as specifically described in Example 1, FIGURE 2 is an artist's conception of the epitaxial growth of ruthenium which occurs upon an eta alumina, and FIGURE 3 is a detailed representation of the defective ruthenium epitaxial growth shown more generally in FIGURE 2 following reduction with hydrogen.

According to processes of the invention, a solution of ruthenium chloride or nitroso nitrate is first heated. The concentration of the ruthenium salt can be widely varied without departing from the spirit of the invention but should preferably be around 0.05 normal and 0.5 normal. If a lower concentration is used the solution volume becomes unmanageable and if a more concentrated solution is used there is undesired tendency for a soluble ruthenate to form.

The temperature to which the solution is first heated can range from about 45° to 85° C. At temperatures below this range precipitation is incomplete and at higher temperatures there is a tendency for the carbonate to decompose prematurely. It is most preferred to use a temperature of about 60° to 70° C. The temperature is maintained, as will be noted hereafter, throughout the process and can of course be raised or lowered at various stages but is in each instance within the ranges specified. It is, however, most preferred that a temperature between 60° and 70° C. be maintained throughout the process for the reasons already observed.

To the heated solution there is added an ammonium carbonate solution. The addition is continued to a pH of about 4. The pH can be 4±0.5 and while no great variation is desirable, satisfactory catalysts can be made with a considerable range of pH. The preferred carbonate is ammonium bicarbonate and the solution strength can widely vary. It is generally preferable that the solution be 0.1 to 1.5 normal. Instead of ammonium bicarbonate there can instead be used ammonium carbonate $$(NH_4)_2CO_3$$

The concentration in this event can range from 0.1 to 8.0 normal.

To the solution thus prepared there can be added the alumina support. It is not imperative that the temperature be maintained during addition of the alumina but it is usually most convenient to allow it to remain about as it was following addition of the carbonate.

The alumina used is designated in the art as eta alumina, 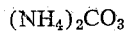. Eta alumina is described and characterized in an article "Thermal Transformations of Aluminas and Alumina Hydrates," Industrial and Engineering Chemistry, vol. 42, July 1950. In addition to a description of its method of preparation, a reproduction of the powder X-ray diffraction pattern is given in FIGURE 4; a tabulation of the phase changes when heated in various atmospheres at various temperatures is given in FIGURE 7; and in Table 1, a complete tabulation of the Debye patterns is presented.

The surface area of the alumina will ordinarily run from about 40 to 300 m.²/g. and it is preferred that the surface area range from 80 to 150 m.²/g.. Pore dimensions will ordinarily fall between about 100 and 400 angstroms in diameter.

The eta alumina can be in the form of granules of almost any size and can range up to pellets or chunks of quarter-inch mesh or even larger but for hydrogenation it is usually preferred that the particles be small. Thus it is most preferred that the particle size be such that substantially all of the product will pass a 325 mesh Tyler screen. Good results can be obtained using hydrogenation catalysts in which the particles range upwardly to 200 mesh or even 80 mesh but these are somewhat less preferred.

The crystallite size in the eta alumina used is very small and is of the order of less than 20 millimicrons. More specifically it is preferred that the crystallite size be in a range of 5 to 10 millimicrons or less. When crystallite size is of the order of 5 microns and below, measurement becomes increasingly difficult by presently available techniques. X-ray diffraction becomes relatively ineffective because the material becomes opaque and only with the most careful and precise techniques can even approximate determinations be made using an electron microscope. It is ordinarily sufficient that the crystallite size be on the average below 10 millimicrons and preferably below 5 millimicrons.

The proportion of the eta alumina is such that the ruthenium computed as metal will constitute about 0.5 to 5% by weight of the alumina as $Al_2O_3$. More specifically, it is preferred that the quantity of ruthenium as metal be about 2% of the alumina.

The slurry prepared as above described is then treated with a further quantity of ammonium bicarbonate. The solution strengths can be as above discussed and the temperature will fall within the range as already described. The addition is continued to about pH 8, that is 8±0.5. This pH is not at all critical and it is only important that neutrality be reached; furthermore a pH much above 8 cannot be obtained with an ammonium bicarbonate. There is, of course, no great point in adding excesses of ammonium bicarbonate beyond neutrality because they must be removed and they can also effect some redissolving of the product.

Following the completion of the addition of ammonium bicarbonate the slurry is then held at an elevated temperature within the ranges already described. The digestion is effected for something in excess of about 20 minutes. It is not harmful to continue the digestion for 5 or 10 hours or even longer, except that time is wasted. About 2 hours represents a practical maximum. It is more specifically preferred that the digestion be continued for about 45 to 75 minutes particularly in the preferred temperature range of 60° to 70° C.

After the digestion the product can simply be filtered and dried if ruthenium nitroso nitrate was used as the starting material. If the chloride was used, then the product should be filtered and be washed with ammonium carbonate solution and preferably with ammonium bicarbonate solution. The solution strengths in each instance can be as above described. The product is then dried, preferably at a temperature below about 200° C.

The dried product is reduced with hydrogen in conventional manner at a temperature from about 150° to 250° C. It is preferable that the temperature be between 170° and 180° C. The hydrogen gas can be diluted with nitrogen or another inert gas in accordance with customary practices. The gas is substantially dry and should not contain so high a proportion of hydrogen as to lead to an exothermal reaction which will raise the temperature above about 250° C. Ordinarily the amount of hydrogen will not be much in excess of about 2%.

The reduced product can then be used as a hydrogenation catalyst or for other catalytic purposes as a finely divided powder or as a slurry.

The catalyst produced is believed well illustrated in FIGURE 2 in which cubes of eta alumina are illustrated. The cubes represent a spinel structure in the incipient stages of formation.

The ruthenium carbonatae precipitate is thought of as forming an epitaxial growth upon the faces of the alumina spinel and is shown at 2 as occurring at one corner, at 3 as occurring at the center of the face, and at 4 as in effect a cube extending through the corner of a face. These forms of epitaxial growth have been observed in other systems and it is believed that the epitaxial growth here is of the type encountered in other systems as in nature with different materials than those here used.

The catalyst precursor of FIGURE 2 is shown as having ruthenium carbonate, $Ru_xCO_3$, as the material precipitated. It is in fact probably a complex mixture of $RuO$, $Ru(OH)_2CO_3$, and $Ru(CO_3)_2$.

The digestion already described causes the epitaxial growth as illustrated and the subsequent reduction then removes oxygen, carbon dioxide and water to leave a defect crystal which is substantially ruthenium. Ruthenium, however, is thought of as remaining on the surfaces as in FIGURE 2 but as a defect crystal as illustrated in FIGURE 3 where 2 designates the ruthenium which is shown as having fissures such as 5 as shown looking going toward a screw axis type defect and with minor pores illustrated at 6.

The epitaxial nature of the growth of ruthenium carbonate and the epitaxial nature of the ruthenium structure on the finished catalyst can be determined in various ways. Thus an X-ray transmission or reflection can be used to show the character of the material present. Alternatively it can be shown that the dried filter cake containing carbonate and the finished product when compared with one not digested is not subject to ready air or water elutriation of ruthenium from the alumina carrier.

In order that the invention may be better understood reference should be had to the following illustrative examples.

*Example 1*

(1) A ruthenium chloride solution is first prepared by dissolving 3 parts by weight of ruthenium chloride, $RuCl_3$, in 72 parts by weight of distilled water containing 3 parts by weight of 37% HCl. This solution is heated to 65° C. while being agitated.

(2) To the solution being agitated, there is added an aqueous solution of ammonium bicarbonate, $NH_4HCO_3$, containing 10 parts by weight of ammonium bicarbonate in 85 parts by weight of distilled water. The addition is continued until a pH of 4 is reached.

(3) To the solution-slurry there is then added 20 parts by weight of eta alumina, the particles of which are small enough to pass a 325 mesh Tyler screen. The eta alumina is of a type having a specific surface area 200 m.$^2$/g. and pore dimensions such that approximately 2% of the pores are between 100 and 200 Angstroms in diameter. A crystallite size as determined by X-ray is below 5 millimicrons and can be confirmed by electronmicrographs.

(4) A further quantity of ammonium bicarbonate solution prepared as above is added to the solution-slurry to a pH of 8.

(5) The slurry was held for 20 minutes at 65° C. During this digestion period the ruthenium carbonate is thought of as reorienting itself to form an epitaxial growth upon the alumina crystallites as illustrated in the drawings as heretofore described. Without the digestion step, the ruthenium carbonate is present as loose particles or at the most as loosely adherent to the alumina particles.

(6) The slurry is then filtered and is washed with a 0.5 normal ammonium bicarbonate solution until no further chloride is found in the wash solution. The filter cake is then dried at 120° C. for 12 hours. Higher temperatures in shorter times can of course be used as this step is in no way critical so long as one does not reach decomposition temperatures or temperatures at which the alumina inverts to another crystalline form or at which the ruthenium is recrystallized or reoriented.

(7) The dry product is reduced with hydrogen at 175° C. for 2 hours using sufficient hydrogen diluted with 95% of nitrogen to be in excess of 5 times the stoichiometric quantity of hydrogen required for complete reduction of the ruthenium oxide to ruthenium metal. This reduction removes oxygen, carbon dioxide and water from the filter cake.

(8) The product thus produced is suitable for use as a hydrogenation catalyst and is essentially eta alumina bearing 5% of ruthenium as an epitaxial growth. The catalyst can be used, for example, for the saturation of ring compounds and substituted ring compounds such as bis para aminophenyl methane to produce by hydrogenation, bis para amino cyclohexyl methane. Similarly, the catalyst can be used for the hydrogenation of benzene to cyclohexane or as aniline to cyclohexylamine. Similarly, the catalyst can be used for the hydrogenation of carbon monoxide to form long chain higher alcohols. The catalysts can also be used for reaction other than hydrogenation such as carbonylation of olefins to ketones, aldehydes and acids; phenol to cyclohexanol; dihydroxy-benzenes to dihydroxycyclohexanols; naphthalene to tetraline and decalin; and substituted naphthalene derivatives to the partially or totally saturated ring products.

In the foregoing example the holding, or digestion, time represents a practical minimum and somewhat better results are obtained using longer times. This of course ties up the equipment and increases the cost of the process. Thus, instead of holding the slurry for 20 minutes, it can be held for an hour with notable increase in properties and can be held for 2 hours, though the extra hour does not add any significant value.

It is noted that the digestion not only increases the activity of the catalyst, but increases its physical stability. By making the catalyst more rugged, the length of its service life is increased.

*Example 2*

According to this example, the procedure of Example 1 is followed with the exceptions which will be noted below.

(1) One part by weight of ruthenium as ruthenium nitroso nitrate is dissolved in 75 parts by weight of distilled water. The ruthenium is heated to 74° C. while being agitated.

(2) Ammonium carbonate solution is used instead of ammonium bicarbonate solution of Example 1. This was made with 6 parts by weight of ammonium carbonate and 85 parts by weight of distilled water. Step 2 is otherwise the same as in Example 1.

(3) Eta alumina is used in the same amount as in Example 1 but which passes 80 mesh and is retained on 200 mesh screen and 20 parts by weight are used. Pore size, surface area and crystallite size are as in Example 1.

(4) This proceeds as in Example 1 but using ammonium carbonate as in item 2.

(5) The slurry is held at 74° C. for one hour.

(6) The solution slurry is filtered, washed and dried as in Example 1. However, it is not essential to use ammonium bicarbonate in the washing or in fact to use washing when the ruthenium nitrate is used as a starting material.

(7) This is effected as in Example 1 but using 98% of nirogen in hydrogen as a reducing gas.

(8) The product is like that of Example 1 and can be used for purposes there described.

Instead of using 20 parts by weight of eta alumina as the carrier, larger amounts of alumina can be added so that there is a smaller amount of ruthenium in the product catalyst. Thus instead of using 20 parts by weight of alumina there can be used 200 parts by weight to yield a catalyst containing 0.5%. Instead an intermediate figure using say 100 parts by weight of alumina can be used.

It is noted that ruthenium does not readily form a nitrate and, as is shown in the literature, it forms an ill defined compound which may represent some kind of an equilibrium with NO, $NO_2$ and $NO_3$ groups. This can generally be designated a ruthenium nitroso nitrate. In other words, this is the product obtained when one attempts to make ruthenium nitrate.

I claim:

1. In a process for making a ruthenium catalyst the steps comprising adding an ammonium carbonate to a ruthenium compound selected from the group consisting of ruthenium chloride and ruthenium nitroso nitrate to a pH of about 4 while heating at 45° to 85° C., adding a finely divided eta alumina, adding an ammonium carbonate to a pH of about 8 while continuing heating at 45° to 85° C., holding at such temperature for at least about 20 minutes, and reducing the catalyst to remove oxygen, $CO_2$, and water.

2. In a process for making a ruthenium catalyst the steps comprising adding an ammonium carbonate to ruthenium chloride to a pH of about 4 while heating at 45° to 85° C., adding a finely divided eta alumina, adding an ammonium carbonate to a pH of about 8 while continuing heating at 45° to 85° C., holding at such temperature for 20 minutes to about 2 hours, washing with an ammonium carbonate to remove chloride, drying the product, and thereafter reducing with hydrogen to remove oxygen, carbon dioxide and water.

3. In a process for making a ruthenium catalyst the steps comprising adding an ammonium bicarbonate to ruthenium chloride to a pH of about 4 while heating at 60° to 70° C., adding a finely divided eta alumina, adding a further quantity of ammonium bicarbonate to a pH of about 8 while continuing heating at 60° to 70° C., holding at such temperature for about 45 to 75 minutes, filtering and washing with ammonium bicarbonate and drying, and thereafter reducing with hydrogen at a temperature of 170° to 180° C. to remove oxygen, carbon dioxide and water.

4. As a catalyst suitable for hydrogenation, eta alumina having a crystallite size less than 20 millimicrons and bearing an epitaxial growth of ruthenium.

5. As a catalyst suitable for hydrogenation, eta alumina having a crystallite size less than 10 millimicrons and bearing 0.5 to 5% by weight based upon the alumina of an epitaxial growth of ruthenium.

References Cited by the Examiner

UNITED STATES PATENTS

| | | | |
|---|---|---|---|
| 1,173,532 | 2/1916 | Mittasch | 252—466 X |
| 2,478,261 | 8/1949 | Frank | 252—472 X |
| 2,487,054 | 11/1949 | Howk | 252—472 X |
| 2,607,807 | 8/1952 | Ford | 252—472 X |
| 2,747,970 | 5/1956 | Rosenblatt | 252—472 X |
| 2,868,847 | 1/1959 | Boyers | 252—460 X |
| 2,965,564 | 12/1960 | Kirshenbaum et al. | 252—466 X |
| 3,055,840 | 9/1962 | Koch | 252—466 X |
| 3,155,724 | 11/1964 | Arthur | 252—472 X |
| 3,161,605 | 12/1964 | Beck et al. | 252—466 X |

OTHER REFERENCES

Parravano: "The Carbon Monoxide-Steam Reaction on Ruthenium Catalysts, "symposium sponsored by Division of Petroleum Chemistry of the American Chemical Society, April 8–13, 1956 (page 99 relied on).

MAURICE A. BRINDISI, *Primary Examiner.*